United States Patent [19]

Kajiyama et al.

[11] Patent Number: 5,777,970
[45] Date of Patent: Jul. 7, 1998

[54] OPTICAL DISK READOUT APPARATUS

[75] Inventors: Seiji Kajiyama, Ibi-Gun; Yoichi Tsuchiya, Hashima; Shuichi Ichiura, Gifu; Tateo Toyama, Gifu; Katsutoshi Hibino, Gifu, all of Japan

[73] Assignee: Sanyo Electric Co., Ltd., Osaka, Japan

[21] Appl. No.: 603,567

[22] Filed: Feb. 21, 1996

[30] Foreign Application Priority Data

| Feb. 22, 1995 | [JP] | Japan | 7-057983 |
| Apr. 23, 1995 | [JP] | Japan | 7-120589 |
| May 30, 1995 | [JP] | Japan | 7-157033 |
| May 14, 1995 | [JP] | Japan | 7-138729 |
| Jan. 31, 1996 | [JP] | Japan | 8-038737 |

[51] Int. Cl.$^6$ ............................................. G11B 7/00
[52] U.S. Cl. ........................ 369/94; 369/59; 369/58; 369/48
[58] Field of Search ................ 369/94, 54, 58, 369/275.2, 275.3, 28, 59, 47, 48

[56] References Cited

U.S. PATENT DOCUMENTS

| 5,408,453 | 4/1995 | Holtslag et al. | 369/94 |
| 5,446,565 | 8/1995 | Komma et al. | 369/94 X |
| 5,499,231 | 3/1996 | Fennema et al. | 369/94 X |
| 5,526,336 | 6/1996 | Park et al. | 369/94 |

FOREIGN PATENT DOCUMENTS

| 427286 | 5/1991 | European Pat. Off. |
| 477380 | 4/1992 | European Pat. Off. |

OTHER PUBLICATIONS

DVD/CD, Nikkei Mechanical 1995, 8.7 No. 460.
K. Nakamura, et al. "Development of Twin Lens Optical Pick–Up for DVD".
Dual focus optical head for 0.6mm and 1.2m disks (II).
Phase change optical disks using thin subtrate.

*Primary Examiner*—Muhammad N. Edun
*Attorney, Agent, or Firm*—Loeb & Loeb LLP

[57] ABSTRACT

An optical disc readout apparatus is disclosured. The apparatus adjusts an optical system which leads the laser beam output from the laser diode to the objective according to the board thickness of the optical disc, and focuses the laser beam onto the information-bearing surface of the disc by the collaboration of the adjusted optical system with the objective. The adjustment can be achieved by, for example, advancing the correction lens to the optical path of the optical system or retreating the correction lens from such optical path. An another apparatus is disclosured. The another apparatus is provided with a first optical system which leads the laser beam output from the first laser diode to the common optical system and a second optical system which leads the laser beam output from the second laser diode to the common optical system. Either the first optical system or the second optical system includes a correction lens. One of the systems is selected according to a type of the loaded disc. Both the first optical system and the second optical system can focus the laser beam onto the information-bearing surface of the disc.

49 Claims, 16 Drawing Sheets

FIG. 2

| types of combination | first wavelength (nm) | second wavelength (nm) | objective NA | +correction lens effective NA | spot diameter for standard density (μm) | spot diameter for high density (μm) |
|---|---|---|---|---|---|---|
| tolerance | ±15 | ±15 | ±0.02 | ±0.02 | ±0.1 | ±0.1 |
| combination 1 | 780 | 650 | 0.6 | →0.45 | 1.5 | 0.93 |
| combination 2 | 780 | 635 | 0.6 | →0.45 | 1.5 | 0.91 |
| combination 3 | 680 | 650 | 0.6 | →0.4 | 1.5 | 0.93 |
| combination 4 | 680 | 635 | 0.6 | →0.4 | 1.5 | 0.91 |
| combination 5 | 650 | 650 | 0.6 | →0.37 | 1.5 | 0.93 |
| combination 6 | 650 | 635 | 0.6 | →0.37 | 1.5 | 0.91 |
| combination 7 | 635 | 635 | 0.6 | →0.36 | 1.5 | 0.91 |

FIG. 4

| types of combination | wavelength [nm] | objective NA | +correction lens effective NA | spot diameter for standard density [μm] | spot diameter for high density [μm] |
|---|---|---|---|---|---|
| unit tolerance | ±15 | ±0.02 | ±0.02 | ±0.1 | ±0.1 |
| combination 8 | 650 | 0.6 | →0.37 | 1.5 | 0.93 |
| combination 9 | 635 | 0.6 | →0.36 | 1.5 | 0.91 |

FIG. 6
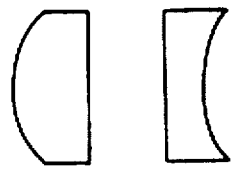
an example of coupling lens

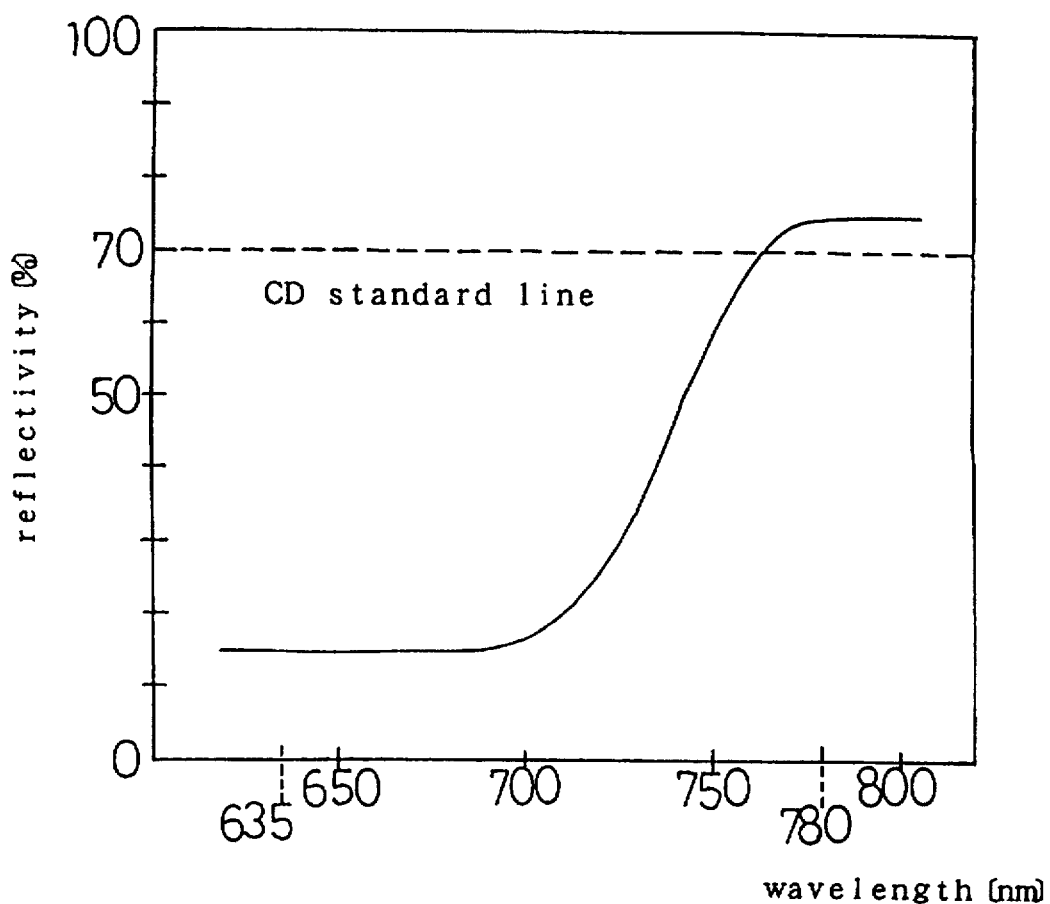

— ● — correction lens (aspherical, low refractive index)
-- ■ -- correction lens (aspherical, high refractive index)

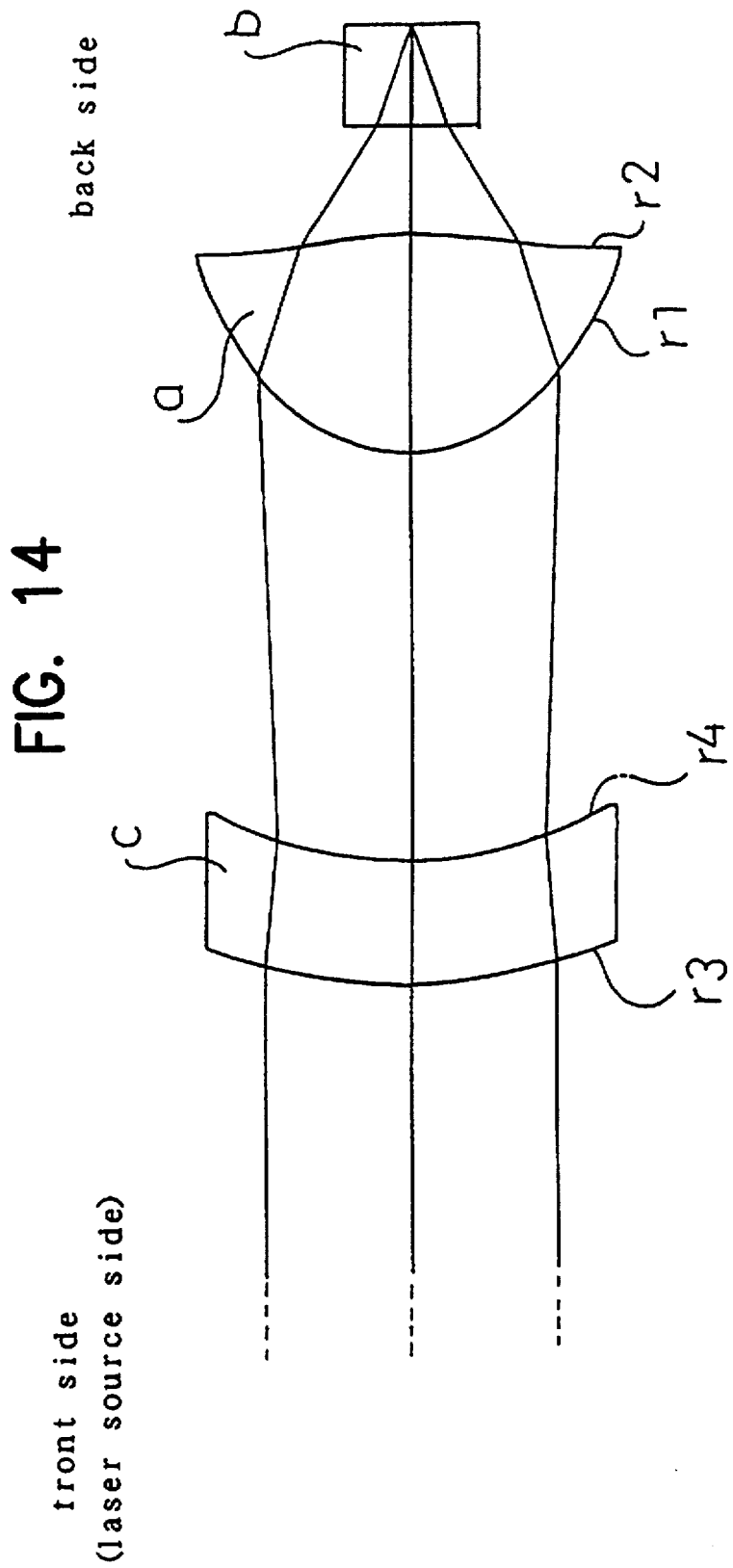

OPTICAL DISK READOUT APPARATUS

BACKGROUND OF THE INVENTION

1. Field of the Invention

The present invention generally relates to optical disc readout apparatus, and more particularly to an optical disc readout system which can read information from both an optical disc with a thick board and an optical disc with a thin board. The optical disc with thick board refers to an optical disc of approximately 1.2 mm thick, for example, and the optical disc with thin board refers to an optical disc of approximately 0.6 mm thick, for example. The thickness of the board is defined in this specification as a distance from the surface of the board to the information-bearing surface. Accordingly, an optical disc of approximately 1.2 mm thick composed of two optical discs of approximately 0.6 mm thick each, adhered to each other back to back, is also referred to as an optical disc of approximately 0.6 mm thick in this specification.

2. Description of the Related Art

A compact disc (CD) is an optical disc whose board thickness is approximately 1.2 mm and track pitch is 1.6 μm. In this specification, the recording density equivalent to that of the CD is referred to as "standard density." Judging from the recent trend of the optical disc toward the higher recording density, it is presumed that the CD, which is an optical disc with the standard density, and the optical disc with a high density will coexist with each other in the near future. Under the circumstances, a readout apparatus which can read information from both the standard density CD and the high density optical disc.

In order to read information from the high density optical disc, the spot diameter of the laser beam focused upon the information-bearing surface must be reduced to approximately 0.9 μm. In order to reduce the spot diameter to such extent, the wavelength of the laser beams must be shortened or the numerical aperture NA of the objective must be increased. However, if the numerical aperture NA of the objective lens is increased, the coma increases in proportion to the third power of the numerical aperture NA of the objective. For this reason, if the laser beam which is fall upon the board surface of the optical disc inclines to the normal to the board surface, there is a problem that the coma increases and consequently the reproduced signals are degraded. The inclination of the optical disc, which makes it impossible for the laser beam to perpendicularly fall upon the board surface, is caused by the warp of the optical disc or otherwise. On the other hand, as the coma is also proportional to the thickness of the optical disc board, it is possible to control the coma due to the inclination of the optical disc board by reducing the thickness of the optical disc board. Based on this principle, in order to reduce the spot diameter of the laser beam to approximately 0.9 μm by increasing the numerical aperture NA of the objective while controlling the coma due to the inclination of the optical disc board, how to reduce the thickness of the optical disc board has been examined.

The objective of the optical pickup is designed considering the thickness of the optical disc board and the wavelength of the laser beam. Therefore, if the board thickness of the optical disc in which information is recorded or from which information is read is different from the board thickness supposed to be in the objective design process, wave aberration is caused. As a result, the laser beam fails to focus upon the information-bearing surface of the optical disc, and the information recording or information reproducing in or from the optical disc is impossible. For example, when an optical pickup mounted with a objective designed for an optical disc of 0.6 mm in board thickness is used, it is impossible to focus the laser beam upon the information-bearing surface of an optical disc of 1.2 mm in board thickness, and therefore, it is impossible to record the information in the optical disc of 1.2 mm thick or read the recorded information from the optical disc of 1.2 mm thick. This means, for two different types of optical discs with different board thicknesses, an optical pickup mounted with two objectives suitable to the respective different types of optical discs must be prepared.

FIG. 5 shows the measured values of the laser beam spot diameters to be focused upon the information-bearing surface of the optical disc (indicated by black circles) and the calculated values of the wave aberrations (indicated by white circles) in a case where an objective which could vary the effective numerical aperture NA by properly shutting off the outer circumferential part was used and the laser beams having a wavelength of 780 nm was irradiated to an optical disc of 1.2 mm in board thickness. This objective is so designed as to be applied to a laser beam having a wavelength of 635 nm and an optical disc of 0.6 mm in board thickness, and the original numerical aperture NA of the objective is 0.6. In this case, as it is evident from FIG. 5, the laser beam spot diameter can not be reduced to 1.5 μm, which is a spot diameter necessary for reproducing the standard density optical disc like the CD. In other words, when an objective designed for a high density optical disc with a thin board is used, it is understood that even if the wavelength of the laser beam and the numerical aperture NA of the objective are switched to be suitable to a standard density CD with a thick board, the CD can not be read.

A readout apparatus which can read information from both the standard density CD with a thick board and the high density optical disc with a thin board can be realized by mounting two different types of optical pickups and thereby controlling the switching according the optical disc. However, such dual pickup type readout apparatus would not only make the readout apparatus expensive but also require a construction for switching the optical pickups and make the mechanism complicated and the apparatus large sized. Due to this problem, it has been desired that a single optical pickup should be able to condense a laser beam on the respective information-bearing surfaces of the two different types of optical discs with the respective spot diameters suitable to the respective optical discs.

In relation to the above, there are prior arts as follows:

In the Japanese Unexamined Patent Publication No. 5-303766, an optical pickup is disclosed which corrects the coma caused by the difference in board thickness of the optical discs without changing the focal length by advancing an aspherical optical element having no refracting power into a collimated light beam or retreating the optical element therefrom according to the thickness of the loaded optical disc. In this arrangement, the pickup can focus the respective beam spots upon the respective information-bearing surfaces of the respective optical discs having different board thicknesses.

In the Japanese Unexamined Patent Publication No. 6-215406, an optical pickup is disclosed which can focus the respective beam spots upon the respective information-bearing surfaces of two different types of optical discs having different board thicknesses.

In the Japanese Unexamined Patent Publication No. 6-259804, an apparatus is disclosed which is equipped with a laser diode for reproducing the standard density CD with a thick board and a laser diode for recording and reproducing the high density optical disc with a thin board and can focus the laser beam output from the laser diode selected according to the optical disc upon the information-bearing surface through a common optical system.

SUMMARY OF THE INVENTION

It is the primary object of the present invention to provide a readout apparatus which can read data from both the standard density optical disc with a thick board (such as CD) and the high density optical disc with a thin board (such as SD) by using a single optical pickup.

The primary object of the present invention can be achieved by adjusting an optical system which leads the laser beam output from the laser diode to the objective according to the board thickness of the optical disc, and focusing the laser beam upon the information-bearing surface of the optical disc by the collaboration of the adjusted optical system with the objective.

The adjustment described above can be achieved by, for example, advancing the correction lens to the optical path which leads the laser beam output from the laser diode to the objective or retreating the correction lens from such optical path. And the advancing and retreating the correction lens can be achieved by displacing the lens holder which holds the correction lens.

It is the second objective of the present invention to provide a mechanism which can precisely advance and retreat the lens to and from the optical path by displacing the lens holder.

The second objective can be achieved by constructing an optical pickup so as to comprise a correction lens holder, a pickup base which is mounted with an optical system, including an objective, and disposed movably in the radial direction of the disc by means of a travel mechanism, a holding mechanism which can hold a correction lens in such a way that the correction lens can relatively displace in the radial direction of the disc against the pickup base and can stabilize at both ends of the relative displacement, an engaging mechanism which makes the relative displacement possible by engaging the correction lens holder at a preset position immediately before the travel end under instructions when the pickup base is moved in the radial direction of the disc, and a controlling means which sets the correction lens off the optical path of the optical system when the optical disc with a thin board is loaded and sets the correction lens in the optical path of the optical system when the optical disc with a thick board is loaded by using the collaboration of the travel mechanism for the pickup base with the engaging mechanism.

It is the third object of the present invention to achieve a readout apparatus which can read information from the two different types of optical discs described above by using a single optical pickup without providing a mechanical moving part to the optical system. It is the fourth object of the present invention to raise the utilization efficiency of the laser beam output from the laser diode used for the optical pickup.

The third and fourth objectives can be achieved by providing the first optical system which leads the laser beam output from the first laser diode to the common optical system and the second optical system which leads the laser beam output from the second laser diode to the common optical system, providing an optical element which has refractability to either of the first optical system or the second optical system, and driving either of the first laser diode or the second laser diode according to the type of the loaded optical disc. Here, the common optical system refers to an optical system which leads the laser beam output from the first optical system and the second optical system to the objective.

The third and fourth objects can also be achieved by constructing the optical system which leads the laser beam output from the laser diode to the objective so as to have two different optical paths, interposing an optical element having refracting power in either of the optical paths, and controlling the optical system so as to select either of the optical paths according to the type of the loaded optical disc.

BRIEF DESCRIPTION OF THE DRAWINGS

FIG. 2 is a table showing the combinations of laser wavelengths, objective numerical apertures NAs, etc. in the first embodiment;

FIG. 4 is a table showing the combinations of laser wavelengths, objective numerical apertures NAs, etc. in the second embodiment;

FIG. 6 is a view exemplifying a shape of the coupling lens;

FIG. 7 is a graph showing the dependability of the reflectivity of a CD-R on the wavelength;

FIG. 8 is a view illustrating a mechanism which advances and retreats the correction lens in and from the optical path by relatively displacing the correction lens holder against the pickup base, wherein

FIG. 14 is a view illustrating a design example of the correction lens, objective and disc thickness;

EMBODIMENT

1. First Embodiment

Figure 1:
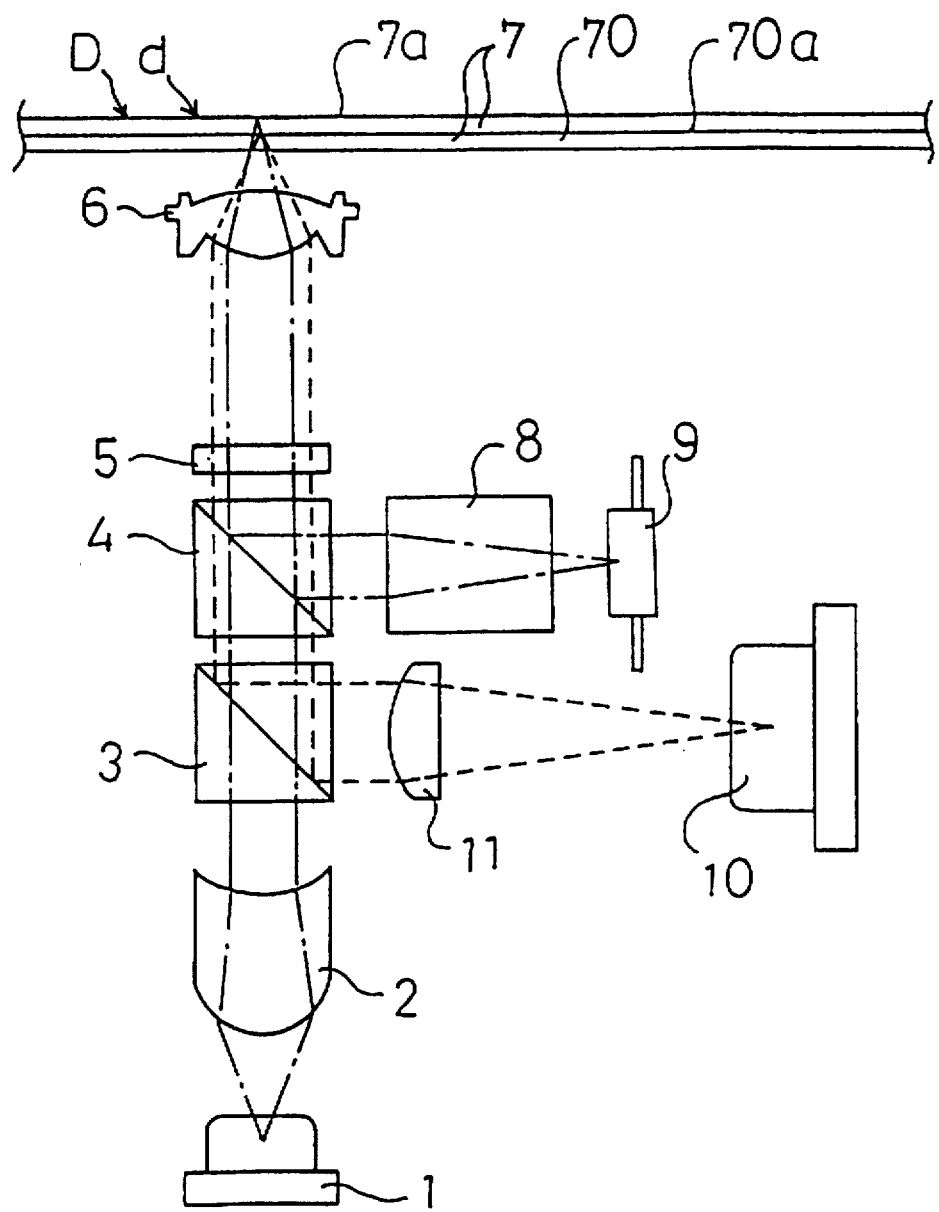
FIG. 1 is a typical schematic illustrating the optical system of an optical pickup according to the first embodiment.

FIG. 1 is a typical schematic illustrating the main part of the optical system of an optical pickup according to the first embodiment. In this Figure, the thin dot-dash line shows a laser beam output from the first laser diode 1, and the thin broken line shows a laser beam output from the second laser diode 10. In FIG. 1, two different optical discs D and d are coincidentally depicted in the same position. The optical disc D is a standard density optical disc composed of an optical disc board 7 of approximately 1.2 mm thick and a information-bearing surface 7a formed on the back of the optical disc board 7. The optical disc d is a high density optical disc composed of two optical discs adhered back to back to each other, each optical disc being composed of an optical disc board 70 of approximately 0.6 mm thick and a information-bearing surface 70a formed on the back of the optical disc board 70. Here, although drawn in a single line in FIG. 1, the information-bearing surface 70a is actually formed on each optical disc board 70 of the two optical discs adhered to each other.

From the first laser diode 1 is output a laser beam of 780±15 nm in wavelength, which is suitable to the readout of the standard density optical disc D of approximately 1.2 mm thick. From the second laser diode 10 is output a laser beam of 635±15 nm in wavelength, which is suitable to the readout of the high density optical disc d of approximately 0.6 mm thick.

The laser beam output from the first laser diode 1 is rectified to be a collimated beam or a diverging beam by a coupling lens (correction lens) 2, then passed through polarizing beam splitters 3 and 4, a λ/4 board 5, an objective 6 and the polycarbonate disc board 7 of approximately 1.2 mm thick in this order, and finally focused upon the information-bearing surface 7a of the optical disc D. The laser beam spot diameter in this case is approximately 1.5±0.1 µm, which is suitable to the readout of the standard density optical disc D. The laser beam reflected on the information-bearing surface 7a is passed through the disc board 7 of approximately 1.2 mm thick, then rectified to be a collimated beam by the objective 6, then passed through the λ/4 board 5, then reflected on the polarizing beam splitter 4, and finally focused upon a photo detection part of a photosensor 9 by a condenser lens 8.

The correction lens 2 functions so as to rectify the laser beam output from the first laser diode 1 to be a collimated beam or a diverging beam. The correction lens 2 also turns the effective numerical aperture NA of the objective 6 to be approximately 0.45, which is suitable to the readout of the standard density optical disc D of approximately 1.2 mm thick, in optical collaboration with the objective 6 and the optical disc board 7 of the optical disc D. In this way, the correction lens 2 has a refracting power to condense or diverge the laser beam, and also play a role of correcting the wave aberration of the laser beam having a wavelength of 780±15 nm. However, the correction lens 2 has no shielding ability. FIG. 6 exemplifies the coupling lens 2.

The laser beam output from the second laser diode 10 are rectified to be a collimated beam by a collimator lens 11, then reflected on the polarizing beam splitter 3, then passed through the polarizing beam splitter 4, the λ/4 board 5, the objective 6 and the polycarbonate disc board 7 made of approximately 0.6 mm thick in this order, and finally focused upon the information-bearing surface 70a of the optical disc d. The laser beam spot diameter in this case is approximately 0.91±0.1 µm, which is suitable to the readout of the high density optical disc d. The laser beam reflected on the information-bearing surface 70a is passed through the disc board 70 of approximately 0.6 mm thick, then rectified to be a collimated beam by the objective 6, then passed through the λ/4 board 5, then reflected on the polarizing beam splitter 4, and finally focused on the photo detection part of the photosensor 9 by the condenser lens 8.

When the objective 6 optically collaborates with the polycarbonate board 70 of approximately 0.6 mm thick of the optical disc d, the effective numerical aperture NA of the objective 6 turns to be approximately 0.6±0.02. In other words, the objective 6 is so designed as to turn the effective numerical apperture NA thereof to be 0.6 in an optical collaboration with the policarbonate board 70 of approximately 0.6 mm thick.

In the readout apparatus mounted with the optical pickup so constructed as described above, when the optical disc D of approximately 1.2 mm thick is loaded, the first laser diode 1 is selected for outputting the laser beam, and when the optical disc d of approximately 0.6 mm thick is loaded, the second laser diode 10 is selected for outputting the laser beam. This makes it possible to read data from both optical discs D and d.

In the above description, the optical disc of read only type is treated. However, the construction illustrated in FIG. 1 can also be applied to an optical disc of direct read after write type and erasable type in the same way as the read only optical discs. As an erasable type optical disc, the construction illustrated in FIG. 1 can be applied not only to a magnetooptical disc but also to an optical disc of phase change type. A CD-R of direct read after write type conventionally provided can preferably be reproduced by a readout apparatus constructed as illustrated in FIG. 1 as the film thereof is so designed as to obtain a high reflectivity for a laser beam of 780 nm in wavelength.

In the actual construction of the oprical pickup illustrated in FIG. 1, a reflector is interposed between the λ/4 board 5 and the objective 6 to deflect the optical path by 90°. This reflector is designed to dispose the optical system ranging from the laser diode 1 or laser diode 10 to the λ/4 board 5 to be parallel with the disc surface and downsize the optical pickup. In FIG. 1, however, for the simplification of the schematic, the reflector is omitted. The reflector may also be constructed by using a prism serving also as a λ/4 board.

Furthermore, the optical pickup so constructed as illustrated in FIG. 1 uses the polarizing beam splitters 3 and 4. Instead thereof, however, half-mirrors may be used.

Still furthermore, the optical pickup so constructed as illustrated in FIG. 1, the correction lens 2 is disposed in the optical path of the first laser diode 1 to turn the effective numerical aperture NA of the objective 6 to be approximately 0.45±0.02 when a laser beam is output from the first laser diode 1, and turn the effective numerical aperture NA of the objective 6 to approximately 0.6±0.02 when a laser beam is output from the second laser diode 10 to the optical system having no correction lens 2. Instead, however, a correction lens may be disposed in the optical path of a laser beam output from the second laser diode 10. Specifically, the correction lens 2 of FIG. 1 may be removed, and a correction lens having optical characteristics different from those of the correction lens 2 is interposed between the second laser diode 10 and the polarizing beam splitter 3 to achieve the similar function as that of the optical pickup of FIG. 1.

Next, with respect to the optical pickup illustrated in FIG. 1, the objective 6 of which is so designed as to turn the effective numerical aperture NA to be 0.6±0.02 when a laser beam is output from the second laser diode 10 and focused upon the information-bearing surface 70a of the optical disc d of approximately 0.6 mm in board thickness, description will be given by referring to FIG. 2 to a "combination" in which a laser diode which outputs a laser beam of 635 nm or 650 nm in wavelength is selected as the second laser diode 10, a laser diode which outputs a laser beam of 780 nm, 680 nm, 650 nm or 635 nm in wavelength is selected as the first laser diode 1, and when a laser beam is output from the first laser diode 1, a laser beam spot of approximately 1.5 µm in diameter is focused upon the information-bearing surface 7a of the optical disc D of approximately 1.2 mm in board thickness.

The first embodiment described above corresponds to the "combination 2" in FIG. 2. Specifically, a laser beam of 780 nm in wavelength is output from the first laser diode 1, and a laser beam of 635 nm in wavelength is output from the second laser diode 10. The effective numerical aperture NA when a laser beam is output from the first laser diode 1 is 0.45. That is, when the objective 6, the correction lens 2 and the disc board 7 of approximately 1.2 mm thick function in collaboration with each other, the numerical aperture NA is 0.45. On the other hand, a laser beam of 635 nm in wavelength output from the second laser diode 10 is focused upon the information-bearing surface 70a of the optical disc d of approximately 0.6 mm in board thickness with a spot diameter of approximately 0.91 µm.

The "combination 1" is a case where a laser diode which outputs a laser beam of 650 nm in wavelength is selected as the second laser diode 10 in the "combination 2." In this case, the laser beam of 650 nm in wavelength output from the second laser diode 10 is passed through the disc board 70 of approximately 0.6 mm thick and focused upon the information-bearing surface 70a with a spot diameter of approximately 0.93 µm.

In the CD-R of direct read after write type, as illustrated in FIG. 7, the shorter the laser wavelength is, the lower the reflectivity is, and sufficient readout output can not be obtained for wavelength shorter than 780 nm. However, according to the optical pickups of the "combination 1" and "combination 2," the direct read after write type optical disc CD-R can be reproduced as a laser diode which outputs a laser beam of 780 nm in wavelength is selected as the first laser diode 1 in the pickups of the "combination 1" and "combination 2."

In the "combination 3" and "combination 4," a laser beam of 680 nm in wavelength is output from the first laser diode 1, and the effective numerical aperture NA in this case is 0.4. In the "combination 3," a laser beam of 650 nm in wavelength is output from the second laser diode 10, then passed through the disc board 70 of approximately 0.6 mm thick, and finally focused upon the information-bearing surface 70a with a spot diameter of 0.93 µm. In the "combination 4," a laser beam of 635 nm in wavelength is output from the second laser diode 10, then passed through the disc board 70 of approximately 0.6 mm thick, and finally focused upon the information-bearing surface 70a with a spot diameter of 0.91 µm.

When a range from 680 nm to 800 nm is selected as the wavelength of the laser beam output from the first laser diode 1 as seen in the "combination 1" through "combination 4," the standard density optical disc of approximately 1.2 mm in board thickness can be reproduced more easily.

In the "combination 5" and "combination 6," a laser beam of 650 nm in wavelength is output from the first laser diode 1, and the effective numerical aperture NA in this case is 0.37. In the "combination 5," a laser beam of 650 nm in wavelength is output from the second laser diode 10, and focused upon the information-bearing surface 70a with a spot diameter of 0.93 µm. In the "combination 6," a laser beam of 635 nm in wavelength is output from the second laser diode 10, and focused upon the information-bearing surface 70a with a spot diameter of 0.91 µm.

In the "combination 7," a laser beam of 635 nm in wavelength is output from the first laser diode 1, and the effective numerical aperture NA in this case is 0.36. A laser beam of 635 nm in wavelength is output from the second laser diode 10, and focused upon the information-bearing surface 70a with a spot diameter of approximately 0.91 µm.

When a range from 630 nm to 680 nm is selected as the wavelength of the laser beam output from the second laser diode 10 as seen in the "combination 1" through "combination 7," the high density optical disc of approximately 0.6 mm in board thickness can be reproduced more easily.

In the combinations described above, it is supposed that the tolerance of each numerical aperture NA is "±0.02," the tolerance of each spot diameter is "±0.1 µm," and the tolerance of each laser wavelength is "±15 nm."

2. Second Embodiment

As seen in FIG. 2, in the "combination 5," the wavelength of each laser beam output from the first laser diode 1 and the second laser diode 10 is 650 nm. In the "combination 7," the wavelength of each laser beam output from the first laser diode 1 and the second laser diode 10 is 635 nm. Therefore, in those combinations in which both the first laser diode 1 and the second laser diode 10 output laser beams of the same wavelength, the same laser diode can be used in common.

Figure 3:
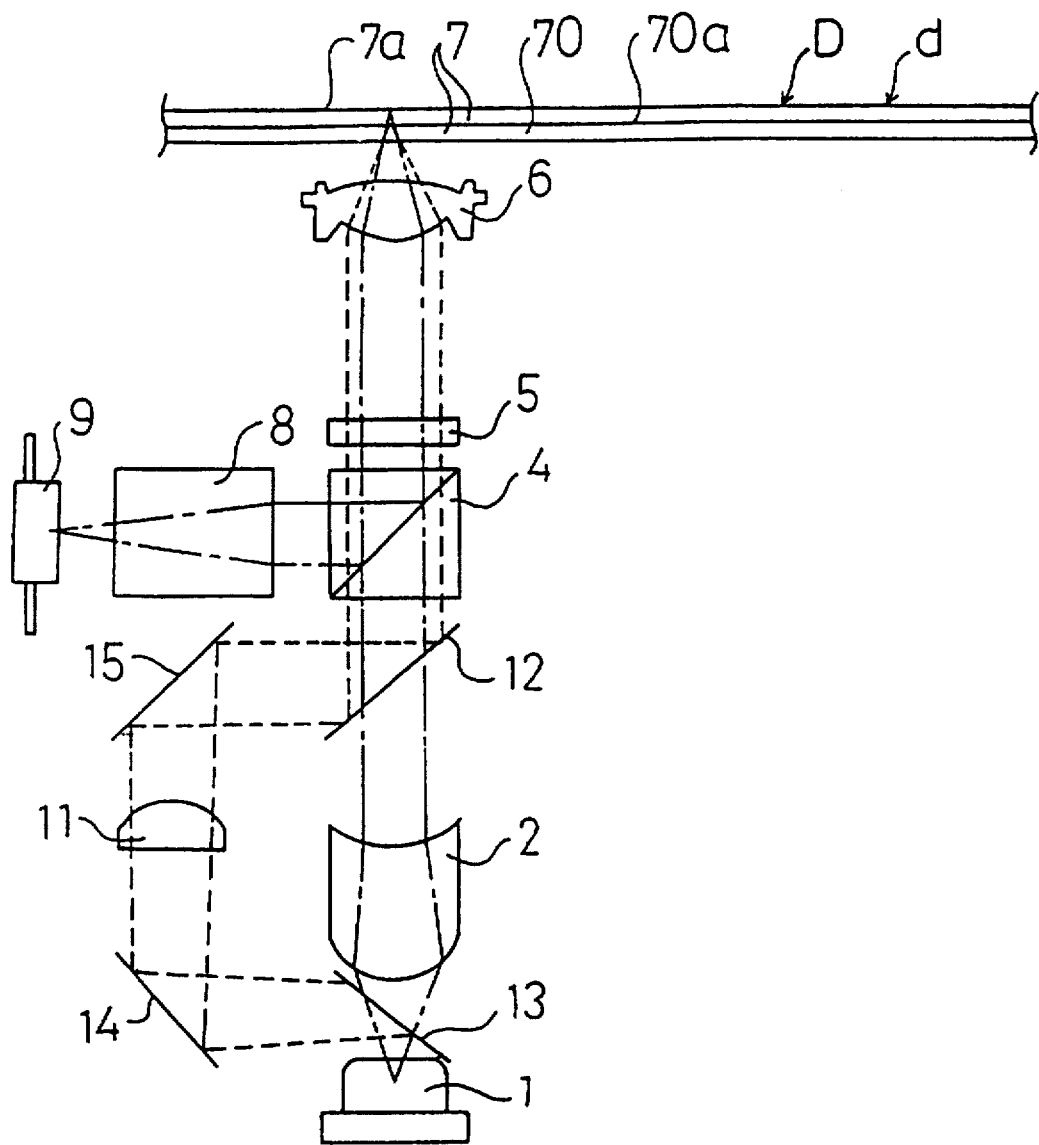
FIG. 3 is a typical schematic illustrating the optical system of an optical pickup according to the second embodiment.
Figure 5:
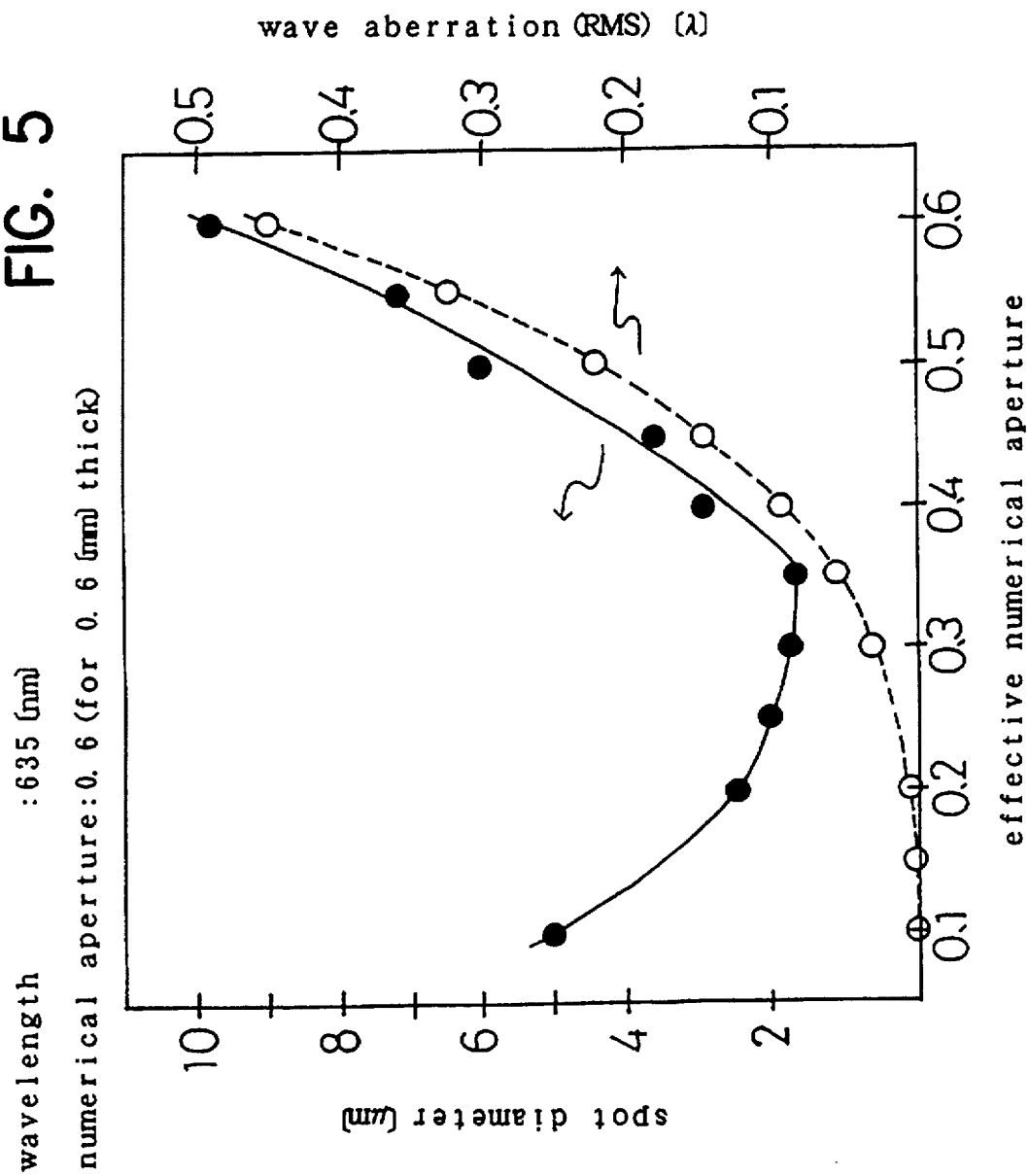
FIG. 5 is a graph showing the relation between the spot diameter and the wave aberration over the effective numerical apertures of the objective of the optical pickup for reproducing high-density optical discs.

FIG. 3 is a typical schematic illustrating the main part of the optical system of an optical pickup according to the second embodiment which uses the same laser diode in common. In this Figure, the same reference numerals as those of FIG. 1 are used for the identical components, and the description thereof will be omitted or simplified.

In FIG. 3, the second laser diode 10, the collimator lens 11 and the polarizing beam splitter 3 of FIG. 1 are not provided. Before and behind the correction lens 2 (viewed from the laser beam source) are provided selective reflecting panels 13 and 12 respectively to switch the optical path. Furthermore, in correspondence to the selective reflecting panels 13 and 12, reflecting panels 14 and 15 and the collimator lens 11 are provided to form an optical path which does not pass through the correction lens 2.

The reflecting panels 13 and 12 are composed of liquid crystal panels, for example. Therefore, when supplied with electric power, the reflecting panels 13 and 12 reflect the laser beams falling thereupon. Accordingly, when electric power is supplied to the reflecting panels 13 and 12, the laser beam output from the first laser diode 1 passes through an optical path composed of the selective reflecting panel 13, the reflecting panel 14, the collimator lens 11, the reflecting panel 15 and the selective reflecting panel 12 in this order, and reach the polarizing beam splitter 4. When electric power supply is cut off, the reflecting panels 13 and 12 permit the laser beam falling thereupon to pass therethrough. Accordingly, the laser beam output from the laser diode 1 passes through an optical path composed of the selective reflecting panel 13, the correction lens 2 and the selective reflecting panel 12 in this order, and reach the polarizing beam splitter 4.

In short, two optical paths are formed, one that runs through the correction lens 2, and the other that does not run through the correction lens 2, and also the selection which optical path should be selected is determined by turning ON/OFF the power supply to the selective reflecting panels 13 and 12. For this reason, the "combination 5" and "combination 7" according to the first embodiment can be achieved by using a single laser diode. In other words, both the standard density thick optical disc D and the high density thin optical disc d can be reproduced by the same single laser diode. In addition, as one laser diode is saved, the manufacturing cost of the apparatus can be saved as much.

Examples applied to the optical pickup so constructed as illustrated in FIG. 3 are illustrated in FIG. 4 as the "combination 8" and "combination 9." That is, a case where a laser diode which outputs a laser beam of 650 nm in wavelength is used as the laser diode 1 and a case where a laser diode which outputs a laser beam of 635 nm in wavelength is used as the laser diode 1 are illustrated. Here, a laser beam having other wavelengths may be used.

3. Extension of the First and Second Embodiments

Each combination described in the description of the first embodiment and second embodiment refers to the optical pickup to be mounted on a readout apparatus for the standard density optical disc of 1.2 mm in board thickness and the high density optical disc of 0.6 mm in board thickness. However, it is possible for the optical pickup to be modified so as to read data from the high density optical disc of approximately 1.2 mm in board thickness instead of or including the above-described standard density optical disc.

In order for the optical pickup to be modified accordingly, as seen in the "combination 5" through "combination 9" in the above description, it should be so arranged that 650 nm or 635 nm is selected as the laser beam wavelength, the objective 6 is so designed as to turn the numeral aperture NA to 0.6 when the objective lens and the board of 0.6 mm thick collaboratively function, and furthermore the correction lens 2 is so designed as to turn the numeral aperture NA to 0.52 when the objective lens, the disc of 1.2 mm thick and the correction lens collaboratively function. By arranging as described above, laser beams can focused upon the information-bearing surface of the high density optical disc of 1.2 mm in board thickness with a spot diameter of 1.2±0.1 µm. In short, two high density optical discs having different thicknesses and possibly a standard density optical disc can be reproduced by a single readout apparatus. The present invention includes such construction.

4. Correction Lens

Figure 15:
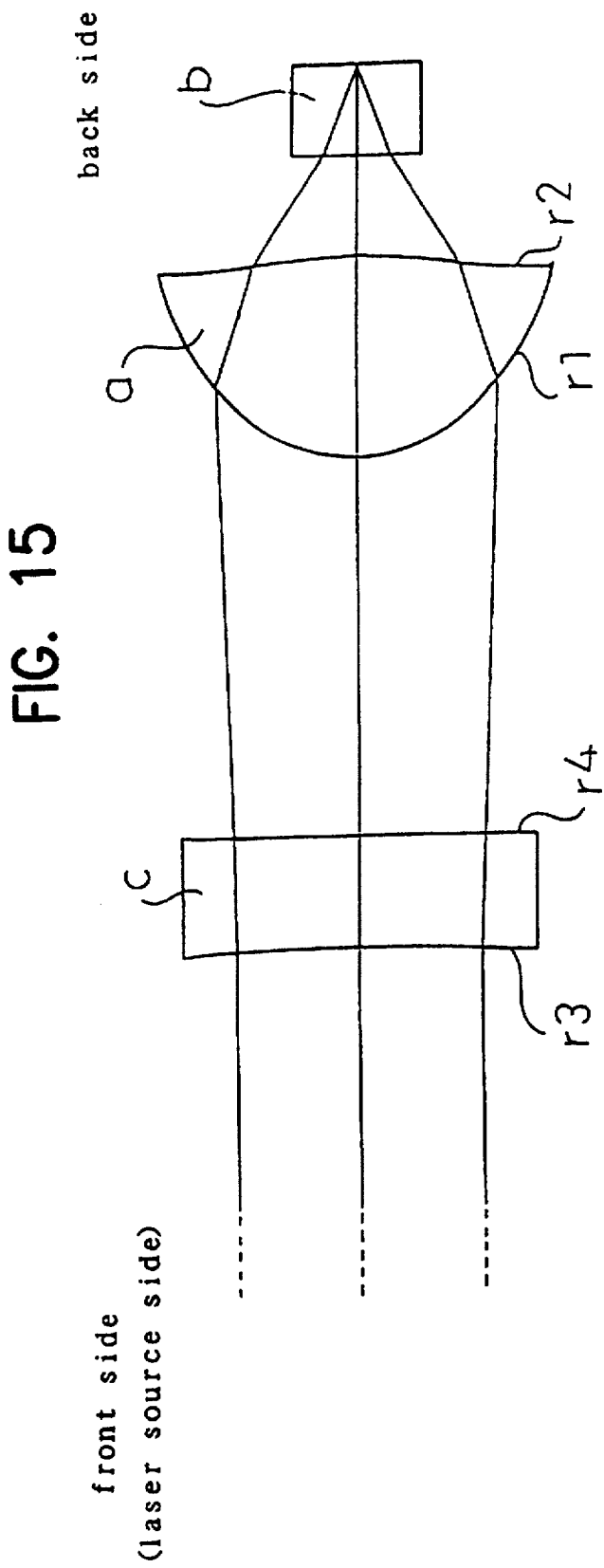
FIG. 15 is a view illustrating another design example of the correction lens, objective and disc thickness.

Now, the correction lens 2 used in the optical pickup illustrated in FIGS. 1 and 3 will be described referring to FIGS. 14 and 15. Here, in FIGS. 14 and 15, the correction lens is denoted by the reference code "c," optical disc is denoted by the code "b," and the objective is denoted by the reference code of "a."

The objective a is an aspherical lens having a refractive index (no) of approximately 1.49, a rough radius of curvature r1 of the front side surface of 1.99 mm, and a rough radius of curvature r2 of the back side surface of 5.32 mm. The objective a has a wave aberration (rms) of 0λ when a laser beam perpendicularly fall thereupon and the optical disc b has a board thickness of 0.6 mm.

4-1. First example (FIG. 14: Low refractive index)

When an optical disc of 1.2 mm in board thickness is loaded as the optical disc b, the aspherical correction lens c having a refractive index (nc) of approximately 1.51, a rough radius of curvature r3 of the front side surface of 6.37 mm, and a rough radius of curvature r4 of the back side surface of 4.78 mm is set to a position 5.5 mm away from the objective a on the laser beam source side. This makes the wave aberration (rms) 0.004λ. That is, by providing the correction lens c on the laser beam source side before the objective a designed for the optical disc of 0.6 mm in board thickness, the laser beam spot suitable to the optical disc of 1.2 mm in board thickness can be obtained.

Figure 10:
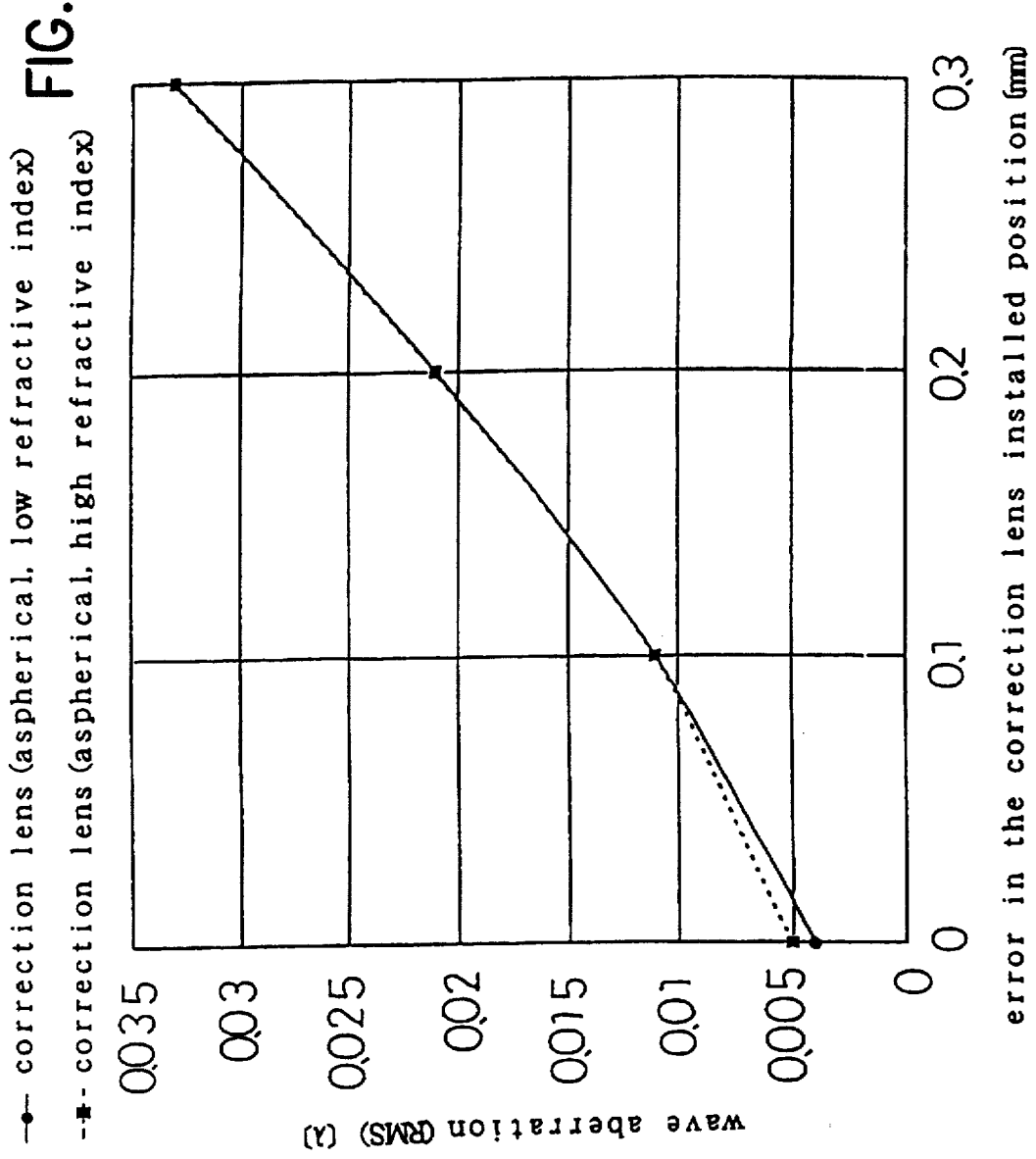
FIG. 10 is a graph showing the relation between the error in the correction lens installed position in the direction perpendicular to the optical axis and the wave aberration.
Figure 11:
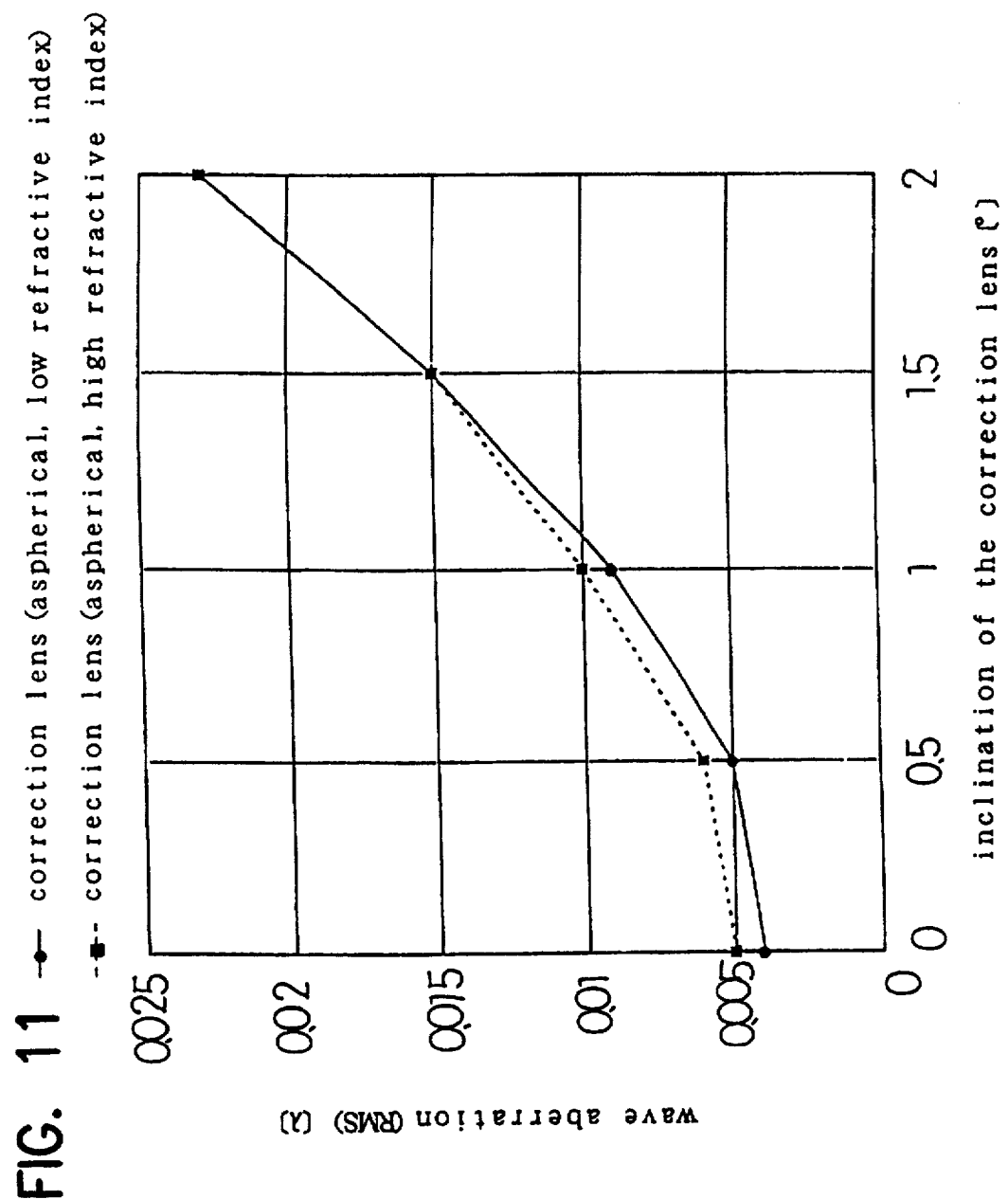
FIG. 11 is a graph showing the relation between the inclination of the correction lens and the wave aberration.

If the correction lens c of the first example inclines by approximately 2° to the optical axis, the wave aberration (rms) when the board thickness of the optical disc b is 1.2 mm is 0.023λ as indicated by the full line in FIG. 11. If the correction lens c shifts by 0.3 mm in the direction perpendicular to the optical axis, the wave aberration (rms) when the board thickness of the optical desk b is 1.2 mm is 0.033λ as indicated by the full line in FIG. 10. Furthermore, if the correction lens c inclines by approximately 2° to the optical axis and shifts by 0.3 mm in the direction perpendicular to the optical path, the wave aberration (rms) when the board thickness of the optical disc b is 1.2 mm is 0.039λ.

In the readout apparatus, therefore, it is understood that even if the correction lens c is fixed and the objective displaces ±0.3 mm, for example, as is seen in tracking control, the optical disc of 1.2 mm in board thickness can be reproduced with no problem by using the correction lens c of the first example.

4-2. Second example (Not illustrated: Low refractive index)

When an optical disc of 1.2 mm in board thickness is loaded as the optical disc b, the aspherical correction lens c having a refractive index (nc) of approximately 1.51, a rough radius of curvature r3 of the front side concave surface of 4.0 mm, and a rough radius of curvature r4 of the back side concave surface of 3.0 mm is set to a position 18 mm away from the objective a on the laser beam source side. This makes the wave aberration (rms) 0.018λ. That is, by providing the correction lens c on the laser beam source side before the objective a designed for the optical disc of 0.6 mm in board thickness, the laser beam spot suitable to the optical disc of 1.2 mm in board thickness can be obtained.

If the correction lens c of the second example inclines by approximately 2° to the optical axis, the wave aberration (rms) when the board thickness of the optical disc b is 1.2 mm is 0.045λ. If the correction lens c shifts by 0.3 mm in the direction perpendicular to the optical axis, the wave aberration (rms) when the board thickness of the optical desk b is 1.2 mm is 0.031λ. Furthermore, if the correction lens c inclines by approximately 2° to the optical axis and shifts by 0.3 mm in the direction perpendicular to the optical path, the wave aberration (rms) when the board thickness of the optical disc b is 1.2 mm is 0.028λ.

In the readout apparatus, therefore, it is understood that even if the correction lens c is fixed and the objective displaces ±0.3 mm, for example, as is seen in tracking control, the optical disc of 1.2 mm in board thickness can be reproduced with no problem by using the correction lens c of the first example.

4-3. Third example (FIG. 15: High refractive index)

When an optical disc of 1.2 mm in board thickness is loaded as the optical disc b, the aspherical correction lens c having a refractive index (nc) of approximately 2.0, a rough radius of curvature r3 of the front side surface of 32 mm, and a rough radius of curvature r4 of the back side surface of 91.9 mm is set to a position 5.5 mm away from the objective a on the laser beam source side. This makes the wave aberration (rms) 0.006λ. That is, by providing the correction lens c on the laser beam source side before the objective a designed for the optical disc of 0.6 mm in board thickness, the laser beam spot suitable to the optical disc of 1.2 mm in board thickness can be obtained.

If the correction lens c of the third example inclines by approximately 2° to the optical axis, the wave aberration (rms) when the board thickness of the optical disc b is 1.2 mm is 0.023λ as indicated by the broken line in FIG. 11. If the correction lens c shifts by 0.3 mm in the direction perpendicular to the optical axis, the wave aberration (rms)

when the board thickness of the optical desk b is 1.2 mm is 0.033λ as indicated by the broken line in FIG. 10. Furthermore, if the correction lens c inclines by approximately 2° to the optical axis and shifts by 0.3 mm in the direction perpendicular to the optical path, the wave aberration (rms) when the board thickness of the optical disc b is 1.2 mm is 0.021λ.

In the readout apparatus, therefore, it is understood that even if the correction lens c is fixed and the objective displaces ±0.3 mm, for example, as is seen in tracking control, the optical disc of 1.2 mm in board thickness can be reproduced with no problem by using the correction lens c of the first example.

4-4. Fourth example (Not illustrated: High refractive index)

When an optical disc of 1.2 mm in board thickness is loaded as the optical disc b, the aspherical correction lens c having a refractive index (nc) of approximately 2.0, a rough radius of curvature r3 of the front side concave surface of 33.5 mm, and a rough radius of curvature r4 of the back side concave surface of 45 mm is set to a position 33.5 mm away from the objective a on the laser beam source side. This makes the wave aberration (rms) 0.001λ. That is, by providing the correction lens c on the laser beam source side before the objective a designed for the optical disc of 0.6 mm in board thickness, the laser beam spot suitable to the optical disc of 1.2 mm in board thickness can be obtained.

If the correction lens c of the fourth example inclines by approximately 2° to the optical axis, the wave aberration (rms) when the board thickness of the optical disc b is 1.2 mm is 0.019λ. If the correction lens c shifts by 0.3 mm in the direction perpendicular to the optical axis, the wave aberration (rms) when the board thickness of the optical desk b is 1.2 mm is 0.007λ. Furthermore, if the correction lens c inclines by approximately 2° to the optical axis and shifts by 0.3 mm in the direction perpendicular to the optical path, the wave aberration (rms) when the board thickness of the optical disc b is 1.2 mm is 0.015λ.

In the readout apparatus, therefore, it is understood that even if the correction lens c is fixed and the objective displaces ±0.3 mm, for example, as is seen in tracking control, the optical disc of 1.2 mm in board thickness can be reproduced with no problem by using the correction lens c of the first example.

As seen in the four examples described above, even if the correction lens c is aspherical and has a low refractive index (1.51 in the first and second examples) or the correction lens c is aspherical and has a high refractive index (2.0 in the third and fourth examples), by setting the correction lens c on the laser beam source side before the objective a designed for the optical disc of 0.6 mm in board thickness as described above, it is possible to properly read data from the optical disc of 1.2 mm in board thickness or properly record data into such optical disc.

It was confirmed by the inventors of the present invention that when the refractive index (no) of the objective a ranged from 1.4 to 1.8, the rough radius of curvature of the surface (r1) of the objective a ranged from 1.5 mm to 3.0 mm, and the rough radius of curvature of the surface (r2) of the objective a ranged from 5.0 mm to 7.0 mm, the same performance as described above could be achieved for the optical disc of 0.6 mm in board thickness.

It was also confirmed by the inventors of the present invention that when the refractive index (nc) of the correction lens c ranged from approximately 1.5 to 2.0, the rough radius of curvature of the surface (r3) of the correction lens c ranged from 4.0 mm to 34 mm, and the rough radius of curvature of the surface (r4) of the correction lens c ranged from 3.0 mm to 95 mm, the same performance as described above could be achieved for the optical disc of 1.2 mm in board thickness.

Figure 12:
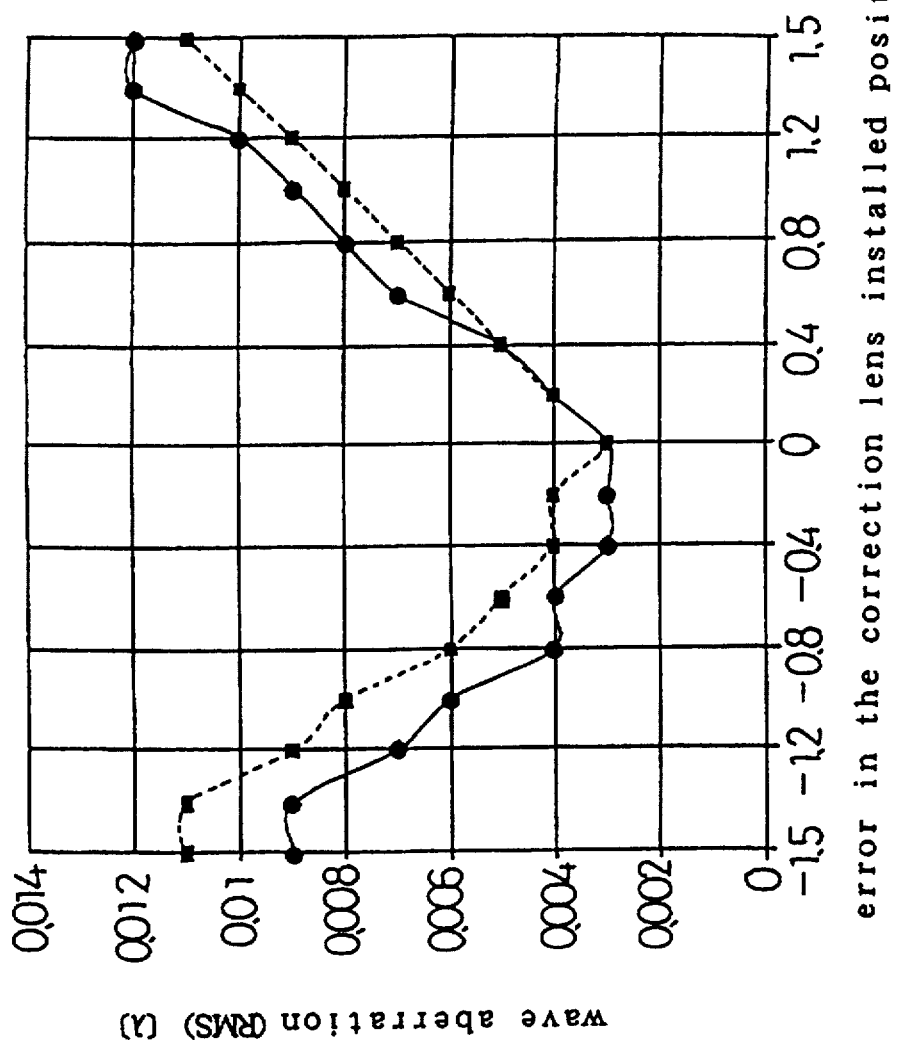
FIG. 12 is a graph showing the relation between the error in the correction lens installed position in the direction of the optical axis and the wave aberration.

It was further confirmed by the inventors of the present invention that even when the correction lens c was set to a position ranged from 4.0 mm to 7.0 mm on the laser beam source side before the objective a or to a position ranged from 14 mm to 22 mm on the laser beam source side before the objective a, the same performance as described above could be achieved for the optical disc of 1.2 mm in board thickness as illustrated in FIG. 12.

Figure 16:
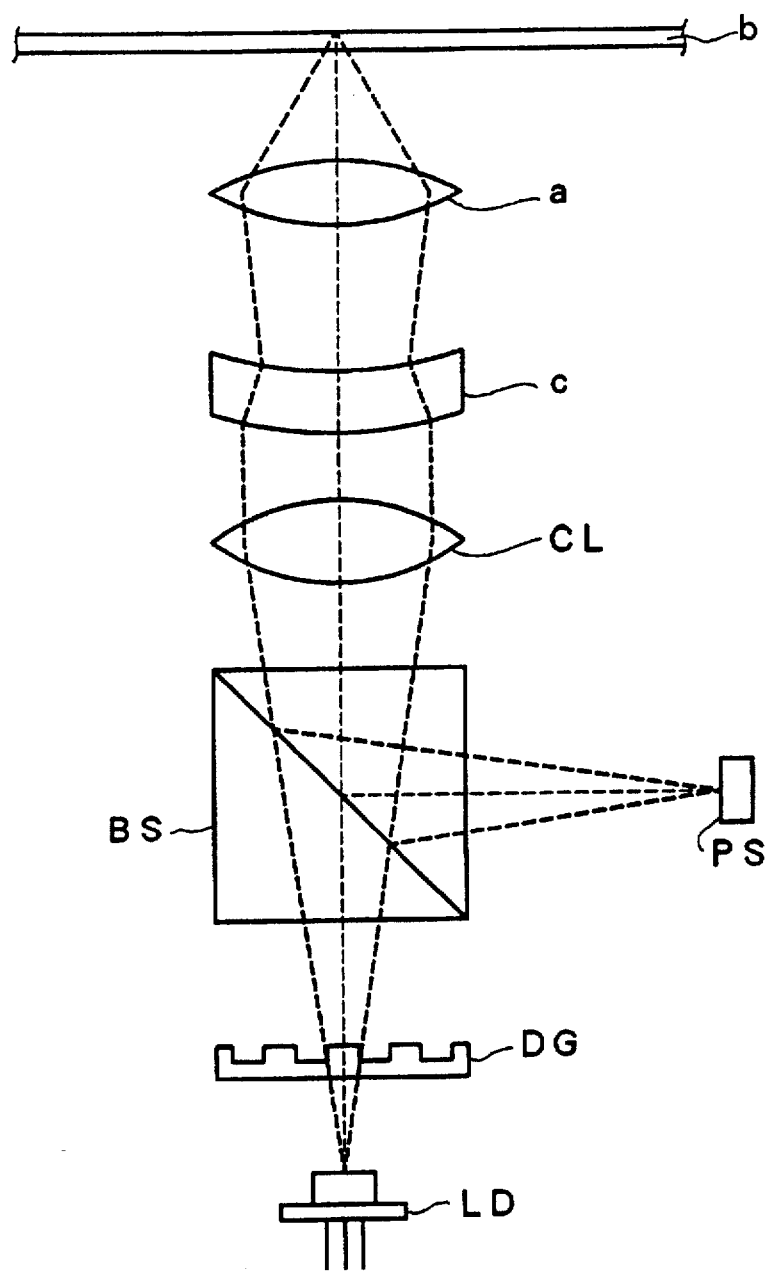
FIG. 16 is a typical schematic illustrating the optical system of an optical pickup according to the third embodiment.

An example of the optical system of the pickup having the correction lens c is illustrated in FIG. 16.

In this Figure, when the optical disc of 1.2 mm in board thickness is reproduced, the correction lens c is advanced to a position indicated in FIG. 16. By this advancement of the correction lens c, the laser beam output from the laser diode LD passes through a diffraction grating DG where side beams for tracking are generated, then passed through the beam splitter BS, and finally focused upon the information-bearing surface which is 1.2 mm deep from the surface of the board of the optical disc b by the correction lens c and the objective a.

The laser beam reflected on the information-bearing surface is passed through the board of 1.2 mm thick of the optical disc b, the objective a and the correction lens c, then rectified to be a collimated beam, then converged by the collimator lens CL, then reflected on the beam splitter BS, and finally focused upon a photo detecting element PS and thereby detected.

On the other hand, in FIG. 16, when the optical disc of 0.6 mm in board thickness is reproduced, the correction lens c is retreated from the indicated position. By this retreat of the correction lens c, the laser beam output from the laser diode is passed through the diffraction grating DG where side beams for tracking are generated, then passed through the beam splitter BS, and finally focused upon the information-bearing surface which is 0.6 mm deep from the surface of the board of the optical disc b by the objective a.

The laser beam reflected on the information-bearing surface is passed through the board of 0.6 mm thick of the optical disc b and the objective a, then rectified to be a collimated beam, then converged by the collimator lens CL, then reflected on the beam splitter BS, and finally focused upon the photo detecting element PS and thereby detected.

5. Third Embodiment (Correction Lens Advancing/Retreating Mechanism)

Here, a mechanism for advancing or retreating the correction lens c illustrated in FIG. 16 to or from the indicated position will be described referring to FIGS. 8 and 9.

Figure 8A:
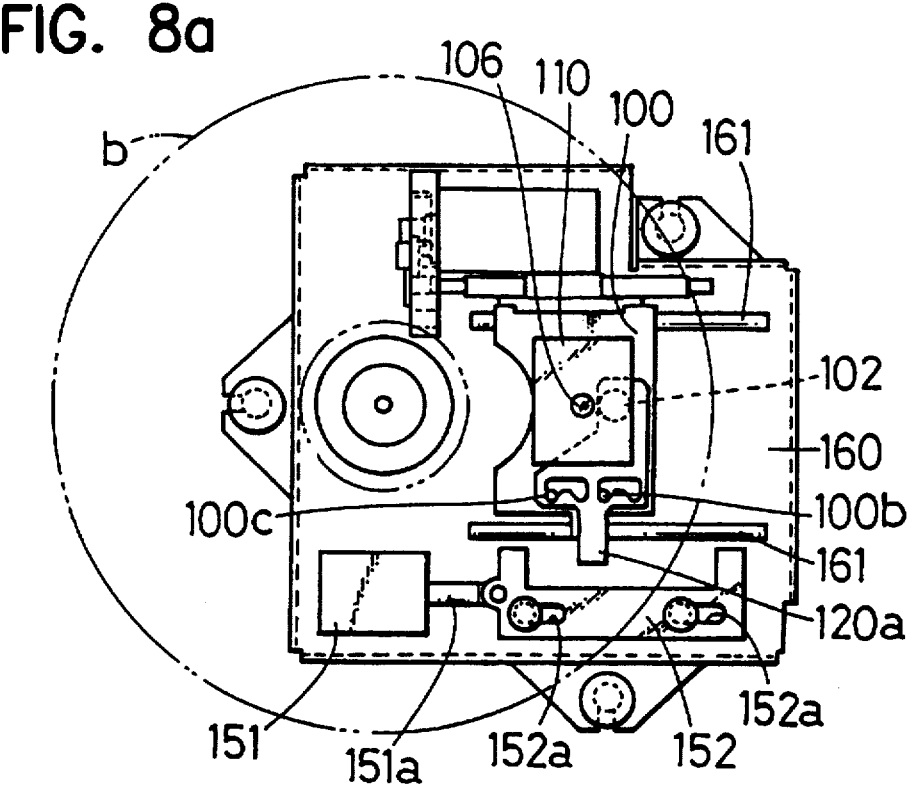
FIG. 8(a) is a top view illustrating the advanced state.
Figure 8B:
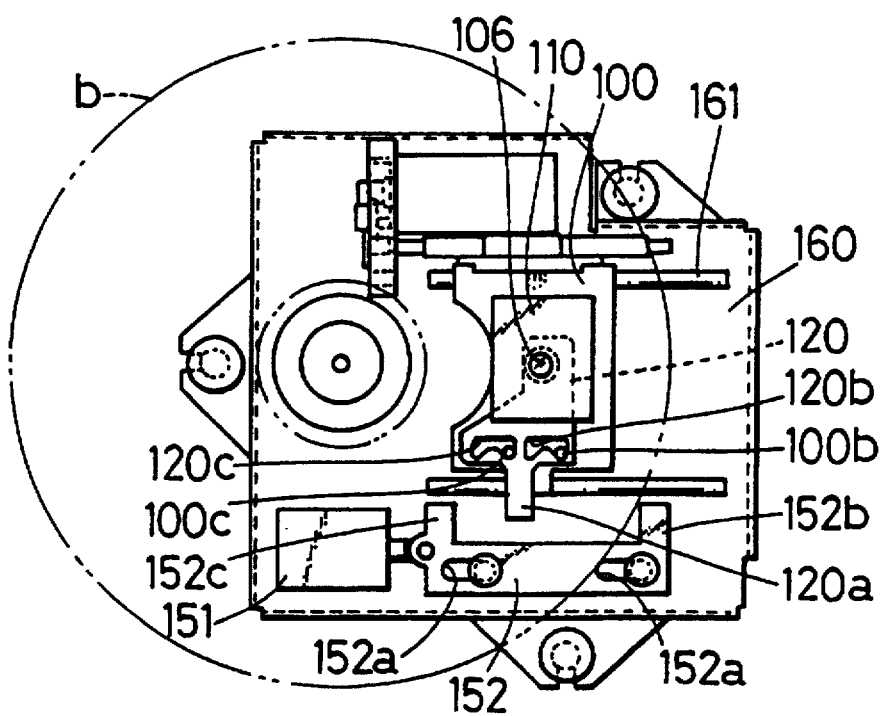
FIG. 8(b) is a top view illustrating the retreated state.
Figure 9:
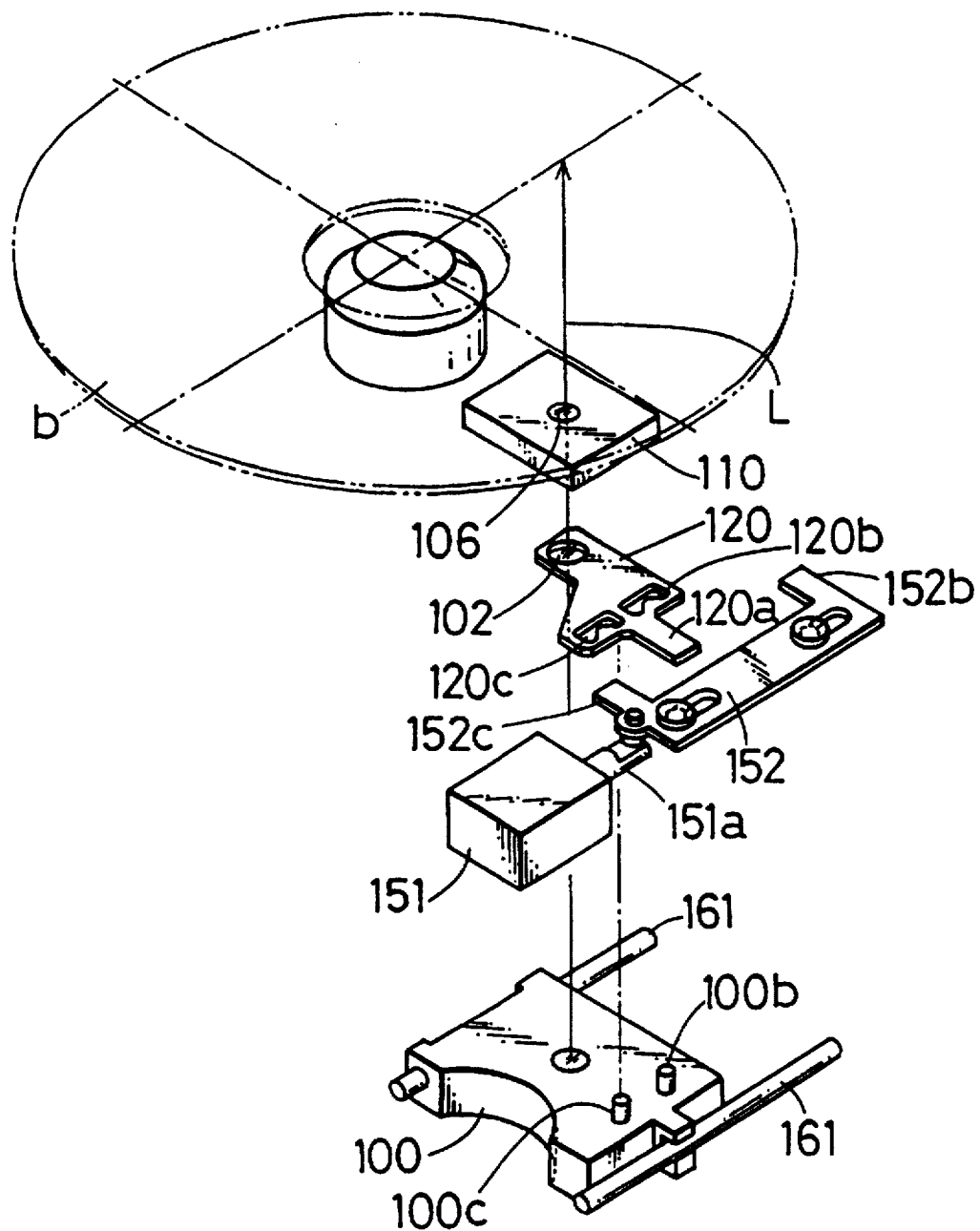
FIG. 9 is perspective view illustrating the disassembled state of the mechanism which advances and retreats the correction lens to and from the optical path by relatively displacing the correction lens holder against the pickup base.

In FIGS. 8 and 9, to a base 160 are fixed two guide rails 161 and 161 in parallel with each other in the radius direction of the optical disc b. These two guide rails 161 and 161 slidably support a pickup base 100. Within the pickup base 100 are mounted various optical members, an optical detector, an actuator, etc. such as seen mounted in ordinary optical pickups. It should be noted here that an objective 106 and a correction lens 102 are located outside (above) the pickup base 100 in the illustrated mechanism.

To the base 160 is fixed a solenoid 151. To an end part of a working bar 151a of the solenoid 151 is linked an engaging member 152. The engaging member 152 is provided on the base 160 so as to be displaceable as long as the length of a long hole 152a in the length direction thereof. The long hole 152a is made in two positions at both near-end portions of the engaging member 152 so as to extend in parallel with the guide rails 161 and 161. To the engaging member 152 is applied the spring force of a spring (not illustrated) to energize the engaging member 152 in the direction leaving the solenoid 151. At both ends of the engaging member 152 are integrally provided engaging parts 152b and 152c as if protruding therefrom toward the inside of the optical disc b respectively. These engaging parts 152b and 152c are protruded parts designed to engage with an engaged part 120a of a correction lens holder 120.

Between an objective holder 110 for supporting the objective 106 and the pickup base 100 is disposed the correction lens holder 120 for supporting the correction lens 102 so as to lie at right angles with an optical axis L. On the correction lens holder 120 is outwardly protrudingly provided the engaged part 120a to be engaged with the engaging parts 152b and 152c in such a position that is parallel with the tangent to the track of the optical disc b. In both near-end positions of the correction lens holder 120 are made holes 120b and 120c. These holes 120b and 120c extend in parallel with the guide rails 161 and 161 respectively. Each of the holes 120b and 120c has recessed parts at both ends thereof. Through the holes 120b and 120c are penetrated pins 100b and 100c respectively, which are upwardly provided on the top of the pickup base 100. As the holes 120b and 120c have the respective recessed parts at both ends, the pins 100b and 100c penetrated through the respective holes 120b and 120c are fittingly set in the recessed parts of either end parts of the respective holes 120b and 120c, and thereby stably engaged in the set positions.

Now, the operation of such mechanism so constructed as described above will be described.

When the solenoid 151 is in the OFF state, as illustrated in FIG. 8(a), the engaging element 152 is held in the position toward the outer circumference of the optical disc b (right side in FIG. 8) by the spring force of the spring (not illustrated). When the pickup base 100 is moved toward the most inner circumference of the optical disc b from this position, the engaged part 120a of the correction lens holder 120 comes to be engaged with the engaging part 152c located on the inner side of the engaging member 152 in a preset position where the pickup base 100 is immediately before the most inner circumferential position of the optical disc b, and thereby the movement of the correction lens holder 120 is stopped in such position. However, the pickup base 100 is moved up to the most inner circumferential position of the optical disc b. In this movement, the correction lens holder 120 displaces toward the outer circumference of the optical disc b relatively to the pickup base 100. Accordingly, the pins 100b and 100c set within the respective recessed parts on the outer circumference side of the optical disc b as illustrated in FIG. 8(b) relatively moves to the inner circumference side of the optical disc b within the respective holes 120b and 120c and fittingly set within the respective recessed parts of the holes 120b and 120c on the inner circumference side of the optical disc b as illustrated in FIG. 8(a).

When the correction lens holder 120 displaces toward the outer circumference of the optical disc b relatively to the pickup base 100 as described above, the correction lens 102 supported by the correction lens holder 120 moves from the position of FIG. 8(b) (the position where the correction lens 102 is on the optical axis L) to the position of FIG. 8(a) (the position where the correction lens 102 is off the optical axis L). In case of the construction illustrated in FIG. 16, the correction lens c moves from the position of the optical disc of 1.2 mm in board thickness to the position of the optical disc of 0.6 mm in board thickness.

When the solenoid 151 is turned ON, the engaging member 152 is attracted by the electric magnetic force of the solenoid 151 and thereby moves to the position of FIG. 8(b) (the position on the inner circumference side of the optical disc b). When the pickup base 100 is moved toward the most outer circumference of the optical disc b from this position, the engaged part 120a of the correction lens holder 120 comes to be engaged with the engaging part 152b located on the outer side of the engaging member 152 in a preset position where the pickup base 100 is immediately before the most outer circumferential position of the optical disc b, and thereby the movement of the correction lens holder 120 is stopped in such position. However, the pickup base 100 is moved up to the most outer circumferential position of the optical disc b. In this movement, the correction lens holder 120 displaces toward the inner circumference of the optical disc b relatively to the pickup base 100. Accordingly, the pins 100b and 100c set within the respective recessed parts on the inner circumference side of the optical disc b as illustrated in FIG. 8(a) moves to the outer circumference side of the optical disc b within the respective holes 120b and 120c and fittingly set within the respective recessed parts of the holes 120b and 120c on the outer circumference side of the optical disc b as illustrated in FIG. 8(b).

When the correction lens holder 120 moves toward the inner circumference of the optical disc b relatively to the pickup base 100 as described above, the correction lens 102 supported by the correction lens holder 120 moves from the position of FIG. 8(a) (the position where the correction lens 102 is off the optical axis L) to the position of FIG. 8(b) (the position where the correction lens 102 is on the optical axis L). In case of the construction of the first embodiment previously described, the correction lens 2 moves from the position for the optical disc of 0.6 mm in board thickness to the position for the optical disc of 1.2 mm in board thickness.

As described above, in the example illustrated in FIGS. 8 and 9, the main mechanism for advancing and retreating the correction lens c to and from the optical path is provided not on the side of the pickup base 100 but on the side of the base 160. That is, the solenoid 151 and the engaging member 152 are provided on the side of the base 160. Therefore, the loading amount of the pickup base 100 can be reduced. This means that the side of the pickup base 100 has to be loaded only with the correction lens holder 120. This can simplify the mechanism for advancing and retreating the correction lens c, and further the weight of the travel mechanism for the pickup base 100 can be reduced.

Now, a mechanism different from the mechanism illustrated in FIGS. 8 and 9 will be described referring to FIG. 13. In this Figure, the correction lens is denoted by the reference numeral "202."

Figure 13E:
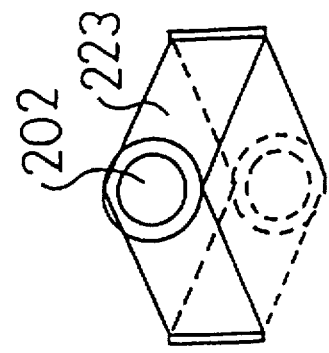
FIG. 13 is a view illustrating various methods of advancing and retreating the correction lens to and from the optical path.
Figure 13C:
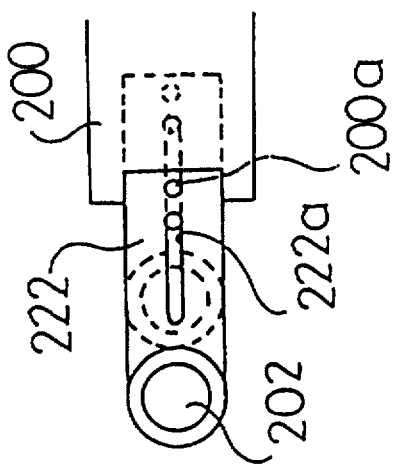
Figure 13D:
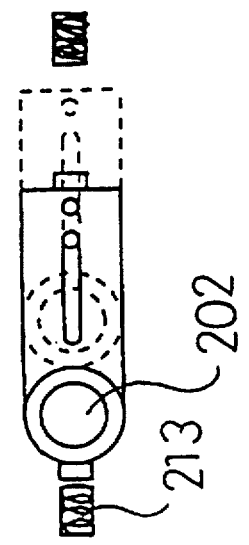
Figure 13A:
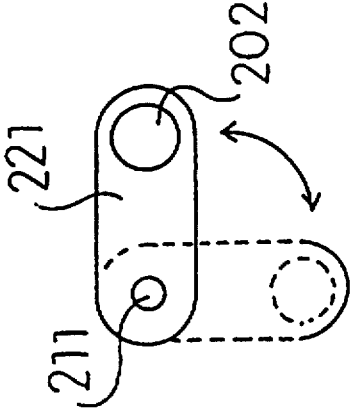
Figure 13B:
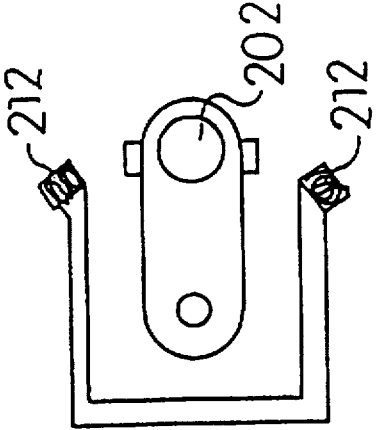

In FIG. 13(a), a correction lens holder 221, which swivels around a pivot 211, is used. The driving force for swiveling the correction lens holder 221 may be realized not only by a motor-and-belt link mechanism but also by a mechanism using electromagnets 212 as illustrated in FIG. 13(b).

In FIG. 13(c), by constructing a correction lens holder 222 to be slidable against a pickup base 200, a mechanism for advancing and retreating the correction lens 202 to and from the optical path is realized. The driving force for sliding the correction lens holder 222 may be realized not only by a motor-and-belt link mechanism but also by a mechanism using electromagnets 213 as illustrated in FIG. 13(d). Here, the range of the sliding of the correction lens holder 222 is limited by a long hole 222a made in the correction lens holder 222 and a pin 200a disposed on the side of the pickup base 200 and penetrated through the long hole 222a.

In FIG. 13(e), by holding the correction lens 202 with a leaf spring 223 and constructing the correction lens 202 to be parallelly movable with the leaf spring 223, a mechanism for advancing and retreating the correction lens 202 to and from the optical path is realized. Here, the leaf spring 223 is structurally the same as that used for driving the actuator of the optical pickup.

We claim:

1. An optical disc readout apparatus capable of interchangeably receiving a first optical disc, the first optical disc having a first thickness and a back surface, and a second optical disc, the second optical disc having a second thickness and a back surface, the readout apparatus comprising:
   a laser source for emitting an incident laser beam;
   a plurality of optical elements including an objective lens for leading the incident laser beam onto the back surface of one of the first optical disc and the second optical disc, and for leading a reflected laser beam from the back surface of one of the first optical disc and the second optical disc onto a photo detector;
   a correction lens; and
   an adjustor for adjusting the optical elements so that the incident laser beam is passed through the correction lens when the second optical disc is loaded, wherein the effective numerical aperture of the objective lens is compatible with the second thickness,
   wherein the adjustor causes the plurality of optical elements to focus substantially the entire incident laser beam to a first spot on the back surface of the first optical disc when the first optical disc is loaded and causes the plurality of optical elements to focus substantially the entire incident laser beam to a second spot on the back surface of the second optical disc when the second optical disc is loaded.

2. An optical disc readout apparatus according to claim 1, wherein the first thickness is 0.060±0.09 and the second thickness is 1.20±0.05 mm.

3. An optical disc readout apparatus according to claim 2, wherein the adjustor shifts the correction lens into the optical path of the incident laser beam when the second optical disc is loaded.

4. An optical disc readout apparatus according to claim 3, wherein the objective lens has a refractive index of 1.4–1.8, a radius of curvature of a front surface of 1.5–3.0 mm, a radius of curvature of a back surface of 5.0–7.0 mm, and wherein the correction lens has a refractive index of 1.5–2.0, a radius of curvature of a front surface of 4.0–34 mm, a radius of curvature of a back surface of 3.0–95 mm, and wherein the correction lens is positioned at a distance of 4.0–7.0 mm from the front surface of the objective lens.

5. An optical disc readout apparatus according to claim 4, wherein the correction lens has an aspherical surface.

6. An optical disc readout apparatus according to claim 5, wherein the adjustor shifts the correction lens by rotating a correction lens holder in a plane which is perpendicular to the optical path.

7. An optical disc readout apparatus according to claim 5, wherein the the adjustor shifts the correction lens by moving a correction lens holder along a straight line which is perpendicular to the optical path.

8. An optical disc readout apparatus according to claim 5, wherein the the adjustor shifts the correction lens by urging a leaf spring holding the correction lens.

9. An optical disc readout apparatus according to claim 4, wherein the adjustor shifts the correction lens by rotating a correction lens holder in a plane which is perpendicular to the optical path.

10. An optical disc readout apparatus according to claim 4, wherein the the adjustor shifts the correction lens by moving a correction lens holder along a straight line which is perpendicular to the optical path.

11. An optical disc readout apparatus according to claim 4, wherein the the adjustor shifts the correction lens by urging a leaf spring holding the correction lens.

12. An optical disc readout apparatus according to claim 3, wherein the adjustor shifts the correction lens by rotating a correction lens holder in a plane which is perpendicular to the optical path.

13. An optical disc readout apparatus according to claim 3, wherein the the adjustor shifts the correction lens by moving a correction lens holder a straight line which is perpendicular to the optical path.

14. An optical disc readout apparatus according to claim 3, wherein the the adjustor shifts the correction lens by urging a leaf spring holding the correction lens.

15. An optical disc readout apparatus according to claim 3, wherein the objective lens has a refractive index of 1.4–1.8 and the radius of curvature of a front surface of 1.5–3.0 mm, a radius of curvature of a back surface of 5.0–7.0 mm, and wherein the correction lens has a refractive index of 1.5–2.0, a radius of curvature of a front surface of 4.0–34 mm, a radius of curvature of a back surface of 3.0–95 mm, and wherein the correction lens is positioned 14–22 mm from the front surface of the objective lens.

16. An optical disc readout apparatus according to claim 15, wherein the adjustor shifts the correction lens by rotating a correction lens holder in a plane which is perpendicular to the optical path.

17. An optical disc readout apparatus according to claim 15, wherein the correction lens has an aspherical surface.

18. An optical disc readout apparatus according to claim 17, wherein the adjuster shifts the correction lens by rotating a correction lens holder in a plane which is perpendicular to the optical path.

19. An optical disc readout apparatus according to claim 17, wherein the adjuster shifts the correction lens by urging a leaf spring holding the correction lens.

20. An optical disc readout apparatus according to claim 15, wherein the adjuster shifts the correction lens by moving a correction lens holder along a straight line which is perpendicular to the optical path.

21. An optical disc readout apparatus according to claim 15, wherein the adjuster shifts the correction lens by urging a leaf spring holding the correction lens.

22. An optical disc readout apparatus according to claim 1, wherein the first thickness is 1.20±0.05 mm and the second thickness is 0.60±0.05 mm.

23. An optical disc readout apparatus according to claim 22, wherein the laser source outputs a laser beam having a wavelength of 650±15 nm.

24. An optical disc readout apparatus according to claim 22, wherein the laser source outputs a laser beam having a wavelength of 635±15 nm.

25. An optical disc readout apparatus according to claim 22, wherein the adjustor shifts the correction lens into the optical path of the incident laser beam when the optical disc having the second thickness is loaded.

26. An optical disc readout apparatus according to claim 25, wherein the adjustor shifts the correction lens by rotating a correction lens holder in a plane which is perpendicular to the optical path.

27. An optical disc readout apparatus according to claim 25, wherein the adjuster shifts the correction lens by urging a leaf spring holding the correction lens.

28. An optical disc readout apparatus according to claim 22, wherein the numerical aperture corresponding to the first thickness is 0.25–0.45 and the effective numerical aperture corresponding to the second thickness is 0.55–0.65.

29. An optical disc readout apparatus according to claim 1, wherein the first thickness is 0.60±0.05 mm and the second thickness is 1.20±0.05 mm.

30. An optical disc readout apparatus according to claim 29, wherein the laser source outputs a laser beam having a wavelength of 650±15 nm.

31. An optical disc readout apparatus according to claim 30, wherein the adjuster shifts the correction lens by moving a correction lens holder along a straight line which is perpendicular to the optical path.

32. An optical disc readout apparatus according to claim 29, wherein the laser source outputs a laser beam having a wavelength of 635±15 nm.

33. An optical disc readout apparatus according to claim 29, wherein the effective numerical aperture corresponding to first thickness is 0.55–0.65 and the effective numerical aperture corresponding to the second thickness is 0.25–0.45.

34. An optical disc readout apparatus capable of interchangeably receiving a first optical disc, the first optical disc having a first thickness and a back surface, and a second optical disc, the second optical disc having a second thickness and a back surface, the optical disc readout apparatus comprising:

a first laser diode for selectively emitting a first laser beam output;

a second laser diode for selectively emitting a second laser beam output;

an objective lens for focusing a directed laser beam onto a back surface of a loaded optical disc, and for leading a reflected laser beam from the back surface of the loaded optical disc to a detecting optical system which leads the reflected laser beam onto a photo detector;

a first optical system including a correction lens for leading the first laser beam output from the first laser diode to the objective lens;

a second optical system for leading the second laser beam output from the second laser diode to the objective lens; and a driver for selecting the first laser beam output as the directed laser beam when the loaded disc is the first optical disc and for selecting the second laser beam output as the directed laser beam when the loaded disc is the second optical disc, wherein the effective numerical aperture of the objective lens is compatible with the first thickness when the second disc is loaded.

35. An optical disc readout apparatus according to claim 34, wherein the first laser diode outputs a laser beam having a wavelength of 665–800 nm, and wherein the second laser diode outputs a laser beam having a wavelength of 620–695 nm.

36. An optical disc readout apparatus according to claim 34, wherein the first laser diode outputs a laser beam having a wavelength of 765–795 nm and wherein the second laser diode outputs a laser beam having a wavelength of 620–650 nm.

37. An optical disc readout apparatus according to claim 34, wherein the first laser diode outputs a laser beam having a wavelength of 765–795 m. and wherein the second laser diode outputs a laser beam having a wavelength of 635–665 nm.

38. An optical disc readout apparatus according to claim 34, wherein the the first disc is a polycarbonate disc has a first thickness of 1.20±0.05 mm and the second disc is a polycarbonate disc has a second thickness of 0.60±0.05 mm.

39. An optical disc readout apparatus according to claim 38, wherein the effective numerical aperture corresponding to the first thickness is 0.25–0.45 and the effective numerical aperture corresponding to the second thickness is 0.55–0.65.

40. An optical disc readout apparatus according to claim 38, wherein the the polycarbonate of the first disc is a high density polycarbonate.

41. An optical disc readout apparatus according to claim 40, wherein the effective numerical aperture corresponding to the first thickness is 0.50–0.54 and the effective numerical aperture corresponding to the second thickness is 0.55–0.65.

42. An optical disc readout apparatus according to claim 34, wherein the first laser diode emits a laser beam of a longer wavelength than the wavelength of the laser beam of the second laser diode.

43. An optical disc readout apparatus according to claim 34, wherein the loaded optical disc is a polycarbonate disc, the first thickness is 0.60±0.05 mm, and the second thickness is 1.20±0.05 mm.

44. An optical disc readout apparatus according to claim 43, wherein the effective numerical aperture corresponding to the first thickness is 0.55–0.65 and the effective numerical aperture corresponding to the second thickness is 0.25–0.45.

45. An optical disc readout apparatus according to claim 43, wherein the polycarbonate of a loaded optical disc having the second thickness is a high density polycarbonate.

46. An optical disc readout apparatus according to claim 45, wherein the effective numeral aperture corresponding to the first thickness is 0.55–0.65 and the effective numerical aperture corresponding to the second thickness is 0.50–0.54.

47. An optical disc readout apparatus having an objective lens for focusing a laser beam onto an optical disc, the optical disc readout apparatus comprising:

a laser diode;

a first optical system for leading a laser beam output from the laser diode to the objective lens through a refractable optical element;

a second optical system for leading a laser beam output from the laser diode to the objective lens without passing the retractable optical element; and a selector for selecting either the first optical system or the second optical system, the selector including a pair of liquid crystal panels being set at branch positions of the two optical systems, each liquid crystal panel reflecting the laser beam when power is on and passing the laser beam when power is off.

48. An optical disc readout apparatus according to claim 47, wherein the laser diode outputs a laser beam having a wavelength of 635–665 nm.

49. An optical disc readout apparatus according to claim 47, wherein the laser diode outputs a laser beam having a wavelength of 620–650 nm.

* * * * *